US00RE38042E

(19) United States
(12) Reissued Patent
Endoh et al.

(10) Patent Number: US RE38,042 E
(45) Date of Reissued Patent: Mar. 25, 2003

(54) ANISOTROPIC MAGNETIC POWDER AND MAGNET THEREOF AND METHOD OF PRODUCING SAME

(75) Inventors: Minoru Endoh, Kumagaya (JP); Yasuto Nozawa, Kumagaya (JP); Katsunori Iwasaki, Kumagaya (JP); Shigeho Tanigawa, Konosu (JP); Masaaki Tokunaga, Fukaya (JP)

(73) Assignee: Hitachi Metals, Ltd., Tokyo (JP)

(21) Appl. No.: 09/985,262

(22) Filed: Nov. 2, 2001

Related U.S. Patent Documents

Reissue of:
(64) Patent No.: 4,983,232
Issued: Jan. 8, 1991
Appl. No.: 07/112,875
Filed: Oct. 27, 1987

(30) Foreign Application Priority Data

Jan. 6, 1987 (JP) ..... 62-857
Sep. 10, 1987 (JP) ..... 62-227388

(51) Int. Cl.[7] ..... H01F 1/053
(52) U.S. Cl. ..... 148/302; 420/83; 420/121
(58) Field of Search ..... 148/302, 309, 148/311, 315; 420/83, 121; 252/62.54

(56) References Cited

U.S. PATENT DOCUMENTS

| | | | | |
|---|---|---|---|---|
| 4,374,665 A | | 2/1983 | Koon | |
| 4,402,770 A | * | 9/1983 | Koon et al. | 148/302 |
| 4,558,077 A | * | 12/1985 | Gray et al. | 148/302 |
| 4,601,875 A | * | 7/1986 | Yamamoto et al. | 149/302 |
| 4,827,235 A | | 5/1989 | Inomata et al. | |
| 4,842,656 A | | 6/1989 | Maines et al. | |
| 4,921,553 A | | 5/1990 | Tokunga et al. | |

FOREIGN PATENT DOCUMENTS

| | | | | |
|---|---|---|---|---|
| EP | 0101552 | * | 2/1984 | |
| EP | 0106948 | * | 5/1984 | |
| EP | 0125752 | * | 11/1984 | |
| EP | 0133758 | * | 3/1985 | 148/302 |
| EP | 0174735 | * | 3/1986 | |
| EP | 0216254 | * | 4/1987 | |
| EP | 0239031 | | 9/1987 | |
| EP | 0248981 | | 12/1987 | |
| JP | 59-46008 | * | 3/1984 | |
| JP | 59-64733 | * | 4/1984 | |
| JP | 59-211549 | * | 11/1984 | |
| JP | 60/100402 | | 6/1985 | |
| JP | 60-100402 | * | 6/1985 | |
| JP | 60-221549 | * | 11/1985 | |
| JP | 60-238447 | * | 11/1985 | |
| JP | 60-243247 | * | 12/1985 | |

OTHER PUBLICATIONS

Abstract of Japan Laid Open No. 61–263201, Nov. 21, 1986.*

Tokunaga et al., "Improvement of Thermal Stability of Nd–Dy–Fe–Co–B Sintered Magnets by Addition of Al, Nb and Ga", IEEE Transactions on Magnetics, vol. MAG–23, No. 5, Sep. 1987, pp. 2287–2289.*

Abstract of Japanese Laid Open No. 61–263201, Nov. 21, 1986.

(List continued on next page.)

*Primary Examiner*—John Sheehan
(74) *Attorney, Agent, or Firm*—Finnegan, Henderson, Farabow, Garrett & Dunner, LLP

(57) ABSTRACT

A the magnetically anisotropic magnetic powder having an average particle size of 1–1000 μm and made from a magnetically anisotropic R-TM-B-Ga or R-TM-B-Ga-M alloy having an average crystal grain size of 0.01–0.5 μm, wherein R represents one or more rare earth elements including Y, TM represents Fe which may be partially substituted by Co, B boron, Ga gallium, and M one or more elements selected from the group consisting of Nb, W, V, Ta, Mo, Si, Al, Zr, Hf, P, C and Zn. This is useful for anisotropic resin-bonded magnet with high magnetic properties.

42 Claims, 1 Drawing Sheet

OTHER PUBLICATIONS

Tokunaga et al., "Improvement of Thermal Stability of Nd–Dy–Fe–Co–B Sintered Magnets by Additions of Al, Nb, and Ga," IEEE, (1987) Transactions on Magnetics, vol. MAG–23, No. 5, pp. 2287–89.

1987 Digest of the Intermag Conference, Tokyo, Japan, Apr. 14–17, p. VII, BC03 and BC04.

Endoh et al., "Magnetic Properties and Thermal Stability of Ga Containing Nd–Fe–Co–B Magnets," Japan Met. Association 4/876.

Hadjipanayis et al., "Cobalt Free Permanent Magnet Materials Based on Iron Rare Earth Alloys," *J. Appl. Phys.,* 55, pp. 2073–77 (1984).

* cited by examiner

ANISOTROPIC MAGNETIC POWDER AND MAGNET THEREOF AND METHOD OF PRODUCING SAME

Matter enclosed in heavy brackets [ ] appears in the original patent but forms no part of this reissue specification; matter printed in italics indicates the additions made by reissue.

BACKGROUND OF THE INVENTION

The present invention relates to a magnetically anisotropic magnetic powder composed of a rare earth element-iron-boron-gallium alloy powder, and a permanent magnet composed of such alloy powder dispersed in a resin, and more particularly to a resin-bonded permanent magnet having good thermal stability composed of a magnetically anisotropic rare earth element-iron-boron-gallium permanent magnet powder having fine crystal grains dispersed in a resin.

Typical conventional rare earth element permanent magnets are $SmCo_5$ permanent magnets, and $Sm_2Co_{17}$ permanent magnets. These samarium cobalt magnets are prepared from ingots produced by melting samarium and cobalt in vacuum or in an inert gas atmosphere. These ingots are pulverized and the resulting powders are pressed in a magnetic field to form green bodies which are in turn sintered and heat-treated to provide permanent magnets.

The samarium.cobalt magnets are given magnetic anisotropy by pressing in a magnetic field as mentioned above. The magnetic anisotropy greatly increases the magnetic properties of the magnets. On the other hand, magnetically anisotropic, resin-bonded samarium.cobalt permanent magnets are obtained by injection-molding a mixture of samarium.cobalt magnet powder produced from the sintered magnet provided with anisotropy and a resin in a magnetic field, or by compression-molding the above mixture in a die.

Thus, resin-bonded samarium cobalt magnets can be obtained by preparing the sintered magnets having anisotropy, pulverizing them and then mixing them with resins as binders.

Recently, neodymium-iron-boron magnets have been proposed as new rare earth magnets surmounting the samarium.cobalt magnets containing samarium which is not only expensive but also unstable in its supply. Japanese Patent Laid-Open Nos. 59-46008 and 59-64733 disclose permanent magnets obtained by forming ingots of neodymium-iron-boron alloys, pulverizing them to fine powders, pressing them in a magnetic field to provide green bodies which are sintered and then heat-treated, like the samarium.cobalt magnets. This production method is called a powder metallurgy method. Also, it was reported to obtain a resin-bonded magnet having magnetic anisotropy by pulverizing an ingot to 0.5–2 $\mu$m and then solidifying it with a wax (Appl. Phys. Lett. 48 (10), Mar. 1986, pp.670–672).

With respect to the Nd-Fe-B permanent magnet, an alternative method has been proposed to the above-mentioned powder metallurgy method.

This method comprises melting a mixture of neodymium, iron and boron, rapidly quenching the melt by such a technique as melt spinning to provide fine flakes of the amorphous alloy, and heat-treating the flaky amorphous alloy to generate an $Nd_2Fe_{14}B$ intermetallic compound. The fine flakes of this rapidly-quenched alloy is solidified with a resin binder (Japanese Patent Laid-Open No. 59-211549). However, the magnetic alloy thus prepared is magnetically isotropic. Then, Japanese Patent Laid-Open No. 60-100402 discloses a technique of hot-pressing this isotropic magnetic alloy, and then applying high temperatures and high pressure thereto so that plastic flow takes place partially in the alloy thereby imparting magnetic anisotropy thereto.

The conventional Nd-Fe-B permanent magnets, however, have the following problems.

First, although the above powder metallurgy can provide magnetic anisotropy and magnetic properties of (BH)max= 35–45MGOe, the resulting magnets essentially have low Curie temperatures, large crystal grain size and poor thermal stability. Accordingly, they cannot be suitably used for motors, etc. which are likely to be used in a high-temperature environment.

Second, although molding is relatively easy by compression molding if rapidly-quenched powder is mixed with a resin, the resulting alloy is isotropic, so that its magnetic properties are inevitably low. For instance, the magnetic properties are (BH)max of 3–5MGOe for those obtained by injection molding and (BH)max of 8–10MGOe for those obtained by compression molding, and further the magnetic properties vary widely depending upon the strength of a magnetic field for magnetizing the alloy. To achieve (BH) max of 8MGOe, the magnetic field should be 50 kOe or so, and it is difficult to magnetize the alloy after assembling for various applications.

In addition, although hot pressing of the rapidly-quenched alloy powder serves to increase the density of the alloy, eliminating pores from the pressed alloy powder to improve weathering properties thereof, the resulting alloy is [isotopic] *isotropic* so that it is disadvantageous just like the permanent magnet prepared by mixing rapidly-quenched alloy powder with a resin. (BH)max of the resulting alloy is improved in proportion to the increase in the density, and it can reach 12MGOe or so. However, it is still impossible to magnetize it after assembling.

By the method of hot-pressing rapidly-quenched alloy powder and then causing plastic flow therein, anisotropy can be achieved like the powder metallurgy method, providing (BH)max of 34–40MGOe, but annular magnets, for instance, magnet rings of 30 mm in outer diameter, 25 mm in inner diameter and 20 mm in thickness cannot easily be formed because die upsetting should be utilized to provide anisotropy.

Finally, with respect to magnets prepared by pulverizing ingots and solidifying them with wax, powders used are so fine that they are likely to be burned, making it impossible to handle them in the atmosphere. Also since the magnets show a low squareness ratio in the magnetization curve, they cannot have high magnetic properties.

Incidentally, attempts were made to provide anisotropic resin-bonded magnets by pulverizing anisotropic sintered magnets prepared by the powder metallurgy method, mixing the pulverized particles with resin and molding them while applying a DC magnetic field, but sufficiently high magnetic properties could not be achieved.

OBJECT AND SUMMARY OF THE INVENTION

Therefore, an object of the present invention is to solve the problems peculiar to the above conventional techniques, thereby providing an anisotropic resin-bonded magnet having good thermal stability and easily magnetizable after assembling, and magnetic powder usable therefor and a method of producing them.

To achieve the above object, the present invention comprises the following technical means.

That is, the object of the present invention has been achieved first by forming magnetically anisotropic magnetic powder having an average crystal grain size of 0.01–0.5 μm from an R-Fe-B-Ga alloy, wherein R represents one or more rare earth elements including Y, Fe may be partially substituted by Co to include an R-Fe-Co-B-Ga alloy, and one or more additional elements (M) selected from Nb, W, V, Ta, Mo, Si, Al, Zr, Hf, P, C and Zn may be contained to include an R-Fe-B-Ga-M alloy and an R-Fe-Co-B-Ga-M alloy, second by forming a pressed powder magnet therefrom, and third by forming a resin-bonded magnet from powder of the above alloy having an average particle size of 1–1000 μm.

The present invention is based on our finding that a thermally stable, anisotropic resin-bonded magnet can be obtained from magnetic powder of an average particle size of 1–1000 μm prepared by pulverizing a magnetically anisotropic R-Fe-B-Ga alloy having an average crystal grain size of 0.01–0.5 μm. It has been found that gallium (Ga) is highly effective to improve the thermal stability of the magnet.

Thus, the magnetically anisotropic magnetic powder according to the present invention has an average particle size of 1–1000 μm and is made from a magnetically anisotropic R-TM-B-Ga alloy having an average crystal grain size of 0.01–0.5 μm, wherein R represents one or more rare earth elements including Y, TM represents Fe which may be partially substituted by Co, B boron and Ga gallium.

The method of producing a magnetically anisotropic magnetic powder according to the present invention comprises the steps of rapidly quenching a melt of an R-TM-B-Ga alloy, wherein R represents one or more rare earth elements including Y, TM represents Fe which may be partially substituted by Co, B boron and Ga gallium, to form flakes made of an amorphous or partially crystallized R-TM-B-Ga alloy pressing these flakes to provide a pressed powder body with a higher density, subjecting it to plastic deformation while heating to form a magnetically anisotropic R-TM-B-Ga alloy having an average crystal grain size of 0.01–0.5 μm, heat-treating it to increase the coercive force thereof, and then pulverizing it.

The method of producing a magnetically anisotropic magnetic powder according to the present invention comprises the steps of rapidly quenching a melt of an R-TM-B-Ga alloy, wherein R represents one or more rare earth elements including Y, TM represents Fe which may be partially substituted by Co, B boron and Ga gallium, to form flakes of an amorphous or partially crystallized R-TM-B-Ga alloy, pressing the flakes to provide a pressed powder body with a higher density, subjecting it to plastic deformation while heating to provide a magnetically anisotropic R-TM-B-Ga alloy having an average crystal grain size of 0.01–0.5 μm, and then pulverizing it without heat treatment.

The magnetically anisotropic pressed powder magnet according to the present invention is made of magnetically anisotropic R-TM-B-Ga alloy having an average crystal grain size of 0.01–0.5 μm, wherein R represents one or more rare earth elements including Y, TM represents Fe which may be partially substituted by Co, B boron and Ga gallium, the magnetically anisotropic R-TM-B-Ga alloy having an axis of easy magnetization.

The magnetically anisotropic resin-bonded magnet according to the present invention is composed of 15–40 volume % of a resin binder and balance R-TM-B-Ga alloy powder having an average crystal grain size of 0.01–0.5 μm, wherein R represents one or more rare earth elements including Y, TM represents Fe which may be partially substituted by Co, B boron and Ga gallium, the magnetically anisotropic R-TM-B-Ga alloy having an axis of easy magnetization.

The magnetically anisotropic magnetic powder according to the present invention an average particle size of 1–1000 μm and is composed of an R-TM-B-Ga-M alloy powder having an average crystal grain size of 0.01–0.5 μm, wherein R represents one or more rare earth elements including Y, TM Fe which may be partially substituted by Co, B boron, Ga gallium and M one or more elements selected from the group consisting of Nb, W, V, Ta, Mo, Si, Al, Zr, Hf, P, C and Zn.

The method of producing a magnetically anisotropic magnetic powder according to the present invention comprises the steps of rapidly quenching a melt of an R-TM-B-Ga-M alloy, wherein R represents one or more rare earth elements including Y, TM represents Fe which may be partially substituted by Co, B boron, Ga gallium, and M one or more elements selected from the group consisting of Nb, W, V, Ta, Mo, Si, A;, Zr, Hf, P, C and Zn, to form flakes made of an amorphous or partially crystallized R-TM-B-Ga-M alloy, pressing these flakes to provide a pressed powder body with a higher density, subjecting it to plastic deformation while heating to form a magnetically anisotropic R-TM-B-Ga-M alloy having an average crystal grain size of 0.01–0.5 μm, heat-treating it to increase the coercive force thereof, and then pulverizing it.

The method of producing a magnetically anisotropic magnetic powder according to the present invention comprises the steps of rapidly quenching a melt of an R-TM-B-Ga-M alloy, wherein R represents one or more rare earth elements including Y, TM Fe which may be partially substituted by Co, B boron, Ga gallium, and M one or more elements selected from the group consisting of Nb, W, V, Ta, Mo, Si, A;, Zr, Hf, P, C and Zn to form flakes made of an amorphous or partially crystallized R-TM-B-Ga-M alloy, pressing the flakes to provide a pressed powder body with a higher density, subjecting it to plastic deformation while heating to provide a magnetically anisotropic R-TM-B-Ga-M alloy having an average crystal grain size of 0.01–0.5 μm, and then pulverizing it without heat treatment.

The magnetically anisotropic pressed powder magnet according to the present invention is made of magnetically anisotropic R-TM-B-Ga-M alloy having an average crystal grain size of 0.01–0.5 μm, wherein R represents one or more rare earth elements including Y, TM represents Fe which may be partially substituted by Co, B boron, Ga gallium, and M one or more elements selected from the group consisting of Nb, W, V, Ta, Mo, Si, Al, Zr, Hf, P, C and Zn, the magnetically anisotropic R-TM-B-Ga-M alloy having an axis of easy magnetization.

The magnetically anisotropic resin-bonded magnet according to the present invention is composed of 15–40 volume % of a resin binder and balance R-TM-B-Ga-M alloy powder having an average crystal grain size of 0.01–0.5 μm, wherein R represents one or more rare earth elements including Y, TM represents Fe which may be partially substituted by Co, B boron, Ga gallium, and M one or more elements selected from the group consisting of Nb, W, V, Ta, Mo, Si, Al, Zr, Hf, P, C and Zn, the magnetically anisotropic R-TM-B-Ga-M alloy having an axis of easy magnetization.

DETAILED DESCRIPTION OF THE INVENTION

Figure 1:
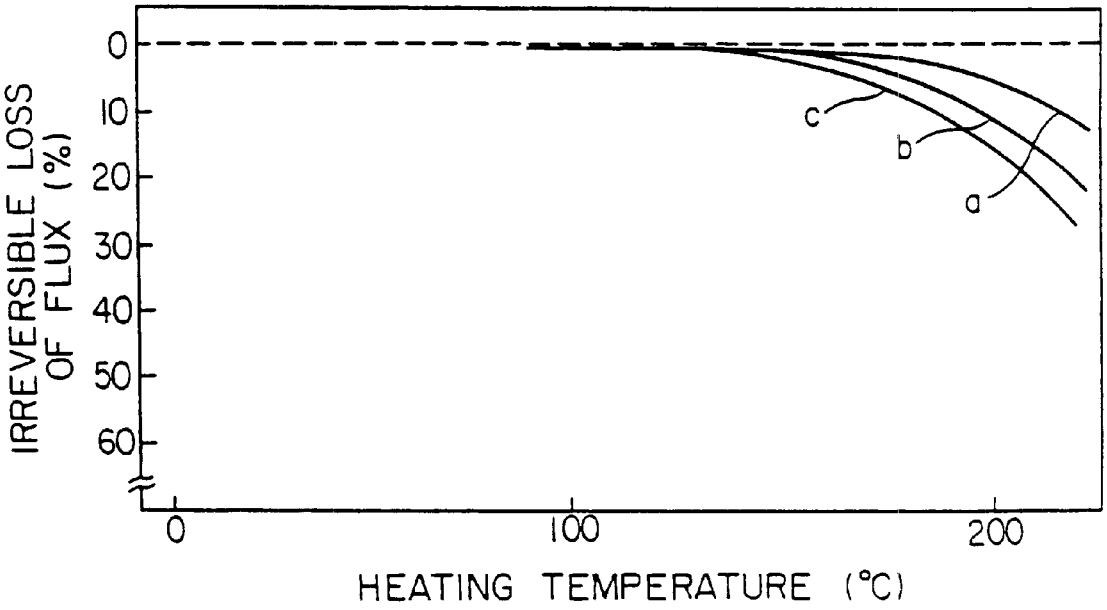
FIG. 1 is a graph showing the variation of irreversible loss of flux with heating temperature of the magnets (a), (b) and (c), wherein (a) denotes a magnet prepared by rapid quenching, heat treatment and resin impregnation, (b) a magnet prepared by rapid quenching, heat treatment and hot pressing, and (c) a magnet prepared by rapid quenching, HIP ("hot isostatic pressing") and die upsetting.

The above alloy has preferably a composition of 11–18 atomic % of R, 5 atomic % or less of Ga, 4–11 atomic % of B, 30 atomic % or less of Co and balance Fe and inevitable impurities, and further preferably a composition of 11–18 atomic % of R, 0.01–3 atomic % of Ga, 4–11 atomic % of B, 30 atomic % or less of Co and balance Fe and inevitable impurities. This alloy may contain one or more additional elements M selected from Nb, W, V, Ta, Mo, Si, Al, Zr, Hf, P, C and Zn. The amount of the additional element M is 3 atomic % or less and more preferably 0.001–3 atomic %. The addition of the additional element M and Ga in combination is effective to further improve the coercive force of the alloy. Of course, the addition of Ga only is effective in some cases.

The R-Fe-B alloy is an alloy containing $R_2Fe_{14}B$ or $R_2(Fe,Co)_{14}B$ as a main phase. The composition range desirable for a permanent magnet is as follows:

When R (one or more rare earth elements including Y) is less than 11 atomic %, sufficient iHc cannot be obtained, and when it exceeds 18 atomic %, the Br decreases. Thus, the amount of R is 11–18 atomic %.

When B is less than 4 atomic %, the $R_2Fe_{14}B$ phase, a main phase of the magnet is not fully formed, resulting in low Br and iHc. On the other hand, when it exceeds 11 atomic %, a phase undesirable for magnetic properties appears, resulting in low Br. Thus, the amount of B is 4–11 atomic %.

When Co exceeds 30 atomic %, the Curie temperature increases but the anisotropy constant of the main phase decreases, making it impossible to obtain high iHc. Thus, the amount of Co is 30 atomic % or less.

When Ga exceeds 5 atomic %, the saturation magnetization $4\pi Is$ and the Curie temperature Tc decrease precipitously. Ga is preferably 0.01–3 atomic %, and more preferably 0.05–2 atomic %.

The addition of one or more additional elements M of Nb, W, V, Ta, Mo, Si, Al, Zr, Hf, P, C and Zn is effective to further increase the coercive force of the alloy, but when M exceeds 3 atomic %, undesirable decrease in $4\pi Is$ and Tc take place. Preferably, the amount of M is 0.001–3 atomic %.

Incidentally, the alloy of the present invention may contain Al contained as an impurity in ferroboron, and further reducing materials and impurities mixed in the reduction of the rare earth element.

In the present invention, when the average crystal grain size of the R-Fe-B-Ga alloy exceeds 0.5 $\mu$m, its iHc decreases, resulting in an irreversible loss of flux of 10% or more at 160° C. which in turn leads to an extreme decrease in thermal stability. On the other hand, when the average crystal grain size is less than 0.01 $\mu$m, the formed resin-bonded magnet has a low iHc so that the desired permanent magnet cannot be obtained. Therefore, the average crystal grain size is limited to 0.01–[0 5] *0.5* $\mu$m.

The ratio of the average dimension (c) of the crystal grains measured perpendicular to their C axes to the average size (a) thereof measured parallel to their C axes is preferably 2 or more.

To provide an anisotropic resin-bonded magnet with high magnetic properties, the R-Fe-B-Ga alloy to be pulverized is required to have a residual magnetic flux density of 8 kG or more in a particular direction, namely in the direction of anisotropy.

The R-TM-B-Ga or R-TM-B-Ga-M alloy is given anisotropy by pressing or compacting flakes obtained by a rapid quenching method, by hot isostatic pressing (HIP) or hot pressing, and then subjecting the resulting pressed body to plastic deformation. One method for giving plastic deformation is die upsetting at high temperatures.

The magnetically anisotropic R-TM-B-Ga or R-TM-B-Ga-M alloy means herein an R-TM-B-Ga or R-TM-B-Ga-M alloy showing anisotropic magnetic properties in which the shape of a $4\pi I$-H curve thereof in the second quadrant varies depending upon the direction of magnetization. A pressed powder body produced by the hot isostatic pressing of flakes usually has a residual magnetic flux density of 7.5 kG or less, while by using an R-TM-B-Ga or R-TM-B-Ga-M alloy having a residual magnetic flux density of 8 kG or more, the resulting resin-bonded magnets have higher magnetic properties such as residual magnetic flux density and energy product, than isotropic resin-bonded magnets.

The method of producing anisotropic magnetic particles and anisotropic powder or resin-bonded magnets will be explained below.

In the present invention, the alloy flakes are pulverized to 100–200 $\mu$m or so. The coarse powder produced by pulverization is molded at room temperature to obtain a green body. The green body is subjected to hot isostatic pressing or hot pressing at 600°–750° C. to form a compacted block having a relatively small crystal grain size. The block is then subjected to plastic working such as die upsetting at 600°–800° C. to provide an anisotropic flat plate. The resulting flat plate product is called herein an anisotropic pressed powder magnet. Depending upon applications, this may be used without further treatment or working. It may be heat-treated but the heat treatment can be omitted by adding Ga, because the addition of Ga increases iHc sufficiently enough in some cases.

The more working, the higher anisotropy the resulting alloy has. If necessary, the flat plate may be heat-treated at 600°–800° C. to improve iHc thereof. Pulverization of this flat plate can provide coarse powder for an anisotropic resin-bonded magnets.

By plastic working, the anisotropic R-Fe-B-Ga alloy has crystal grains flattened in the C direction. The crystal grains desirably have the ratio of the average dimension (c) thereof in perpendicular to their [c] *C* axes to the average dimension (a) thereof in parallel to their C axes of 2 or more, so that the magnet has a residual magnetic flux density of 8 kG or more. Incidentally, the average crystal grain size is defined herein as a value obtained by averaging the diameters of 30 or more crystal grains, which are converted to spheres having the same volume.

When the plastic working is accomplished by die upsetting while heating, particularly high magnetic properties can be obtained.

By heat-treating the R-Fe-B magnet which is given anisotropy by the plastic working step, an increased coercive force can be obtained.

The heat treatment temperature is desirably 600°–900° C., because when it is less than 600° C., the coercive force cannot be increased, and when it is higher than 900° C., the coercive force decreases relative to the value than before the heat treatment.

The heat treatment is conducted for a period of time needed for keeping a sample at a uniform temperature. Taking productivity into consideration, it is 240 minutes or less.

The cooling rate should be 1° C./sec or more. When the cooling rate is less than 1° C./sec, the coercive force decreases compared to the value before the heat treatment. Incidentally, the term "cooling rate" used herein means an average cooling rate from the heat treatment temperature (° C.) to (heat treatment temperature+room temperature)/2 (° C.). However, the addition of Ga makes the heat treatment unnecessary in some cases, in which not only is the heat treatment step eliminated but also large magnets used for voice coil motors, etc. can be produced which suffer from substantially no cracking or oxidation.

In the present invention, the average particle size of the pulverized powder is 1–1000 μm for the following reasons: When it is less than 1 μm, the powder is easily burned, making it difficult to handle it in the air, and when it exceeds 1000 μm, a thin resin-bonded magnet of 1–2 mm in thickness cannot be produced, and also it is not suitable for injection molding.

The pulverization may be carried out by a usual method such as by a disc mill, a brown mill, an attritor, a ball mill, a vibration mill, a jet mill, etc.

The coarse powder can be blended with a thermosetting resin binder and compression-molded in a magnetic field and then thermally cured to provide an anisotropic resin-bonded magnet of a compression molding type. Further, the coarse powder can be blended with a thermoplastic resin binder and injection-molded in a magnetic field to provide an anisotropic resin-bonded magnet of an injection molding type.

As materials usable for the above binders, thermosetting resins are easiest to use in the case of compression molding. Thermally stable polyamides, polyimides, polyesters, phenol resins, fluorine resins, silicone resins, epoxy resins, etc. may be used. And Al, Sn, Pb and various low-melting point solder alloys may also be used. In the case of injection molding, thermoplastic resins such as ethylene-vinyl acetate resins, nylons, etc. may be used.

EXAMPLE 1

An $Nd_{15}Fe_{77}B_7Ga_1$ alloy was prepared by arc melting, and this alloy was formed into thin flakes by rapid quenching via a single roll method in an argon atmosphere. The peripheral speed of the roll was 30 m/sec., and the resulting flakes were in irregular shapes of about 30 μm in thickness. And as a result of X-ray diffraction measurement, it was found that they were composed of a mixture of amorphous phases and crystal phases. These thin flakes were pulverized to 32 mesh or finer and then compressed by a die at 6 tons/cm$^2$ without applying a magnetic field. The resulting compressed product had a density of 5.8 g/cc. The compressed product body was hot-pressed at 750° C. and 2 tons/cm$^2$. The alloy after hot pressing had a density of 7.30 g/cc. Thus, a sufficiently high density was provided by hot pressing. The bulky product or pressed powder body having a higher density was further subjected to die upsetting at 750° C. The height of the sample was adjusted so that a compression ratio was 3.8 before and after the upsetting. That is, $h_0/h=3.8$, wherein $h_0$ was the height before the upsetting and h the height after the upsetting.

The upset sample was heated in an Ar atmosphere at 750° C. for 60 minutes, and then cooled by water at a cooling rate of 7° C./sec. The magnetic properties before and after the heat treatment are shown in Table 1.

TABLE 1

| | Br [kG] *(kG)* | bHc [kOe] *(kOe)* | iHc [kOe] *(kOe)* | [BH]max *(BH)max* [MGOe] *(MGOe)* |
|---|---|---|---|---|
| Before Heat Treatment | 11.7 | 11.0 | 20 | 32.2 |
| After Heat Treatment | 11.7 | 11.0 | 21.0 | 32.2 |

The heat-treated sample was pulverized to have a particle size range of 250–500 μm. The resulting magnetic powder was mixed with 16 vol. % of an epoxy resin in a dry state, and the resulting powder was molded in a magnetic field of 10 kOe perpendicular to the direction of compression. Next, by thermally curing it at 120° C. for 3 hours, an anisotropic resin-bonded magnet was obtained. The resulting anisotropic resin-bonded magnet had magnetic properties of Br=7.6 kG, bHc=6.8 kOe, iHc=19.0 kOe and (BH)max=13.5MGOe when measured at a magnetization intensity of 25 kOe.

For comparison, rapidly quenched thin flakes having the composition of $Nd_{17}Fe_{73}B_8Ga_2$ was heat-treated at 600° C. for one hour in vacuum, pulverized to 250–500 μm and formed into a resin-bonded magnet in the same manner as above. Incidentally, since this resin-bonded magnet was isotropic, no magnetic field was applied in the compression molding step. The magnetic properties thereof measured at a magnetization intensity of 25 kOe was Br of 6.3 kOe, bHc of 5.2 kOe, iHc of 22.1 kOe and (BH)max of 6.8 MGOe (Comparative Example 1).

It is clear from the above that the anisotropic resin-bonded magnet of the present invention has better magnetization and higher magnetic properties than the comparable isotropic resin-bonded magnet.

For comparison, an ingot having the composition of $Nd_{15}Fe_{77}B_7Ga_1$ was pulverized in the same manner as in the above Example, mixed with a binder, molded in a magnetic field and heat-set. No hot pressing or plastic working was carried out. The magnetic properties thereof measured at a magnetization strength of 25 kOe were Br of 3.8 kOe and bHc of 0.3 kOe (Comparative Example 2).

Thus, anisotropic resin-bonded magnets prepared from ingots cannot be utilized as practical materials because high iHc cannot be achieved. The results of Example 1 and Comparative Example are summarized in Table 2 below.

TABLE 2

| Sample | Average Crystal Grain Size (μm) | Br (KG) | bHc (KOe) | iHc (KOe) | (BH)max (MGOe) | Type |
|---|---|---|---|---|---|---|
| Example 1 | 0.09 | 7.6 | 6.5 | 19.0 | 13.5 | Anisotropic Resin-Bonded Magnet |
| Comparative Example 1 | 0.06 | 6.3 | 5.2 | 22.1 | 6.8 | Isotropic Resin-Bonded Magnet |
| Comparative Example 2 | 200 | 3.8 | 0.3 | 0.3 | 0.5 | Anisotropic Resin-Bonded Magnet* |

Note
*Prepared from ingot

EXAMPLE 2

Next, the influence of a compression ratio in die upsetting on final anisotropic resin-bonded magnets will be shown. With respect to composition and conditions of rapid quenching, hot pressing, molding in a magnetic field in perpendicular to the direction of compression, heat treatment and curing, this Example was the same as Example 1.

The results are shown in Table 3. The magnetic properties shown in Table 3 are values obtained at a magnetization intensity of 25 kOe. As is shown in Table 3, the increase of the compression ratio serves to increase the magnetic properties of the resulting anisotropic resin-bonded magnet.

Incidentally, when the compression ration $h_0/h$ was 5.6 or more, cracking appeared in the periphery of the samples after die upsetting, but no influence took place on the final anisotropic resin-bonded magnets of the compression molding type.

TABLE 3

| Compression Ratio (ho/h) | Average Crystal Grain Size (μm) | Br (KG) | bHc (KOe) | iHc (KOe) | (BH)max (MGOe) |
|---|---|---|---|---|---|
| 2.4 | 0.07 | 6.4 | 5.9 | 21.1 | 9.0 |
| 3.0 | 0.09 | 7.3 | 6.2 | 19.8 | 12.5 |
| 4.1 | 0.10 | 7.9 | 6.5 | 18.6 | 14.1 |
| 5.6 | 0.11 | 7.9 | 6.6 | 17.1 | 14.0 |
| 6.3 | 0.11 | 8.0 | 6.8 | 16.6 | 14.1 |
| 7.2 | 0.11 | 8.1 | 6.8 | 15.0 | 14.4 |

EXAMPLE 3

Magnetic powder was prepared from an $Nd_{14}Fe_{79}B_6Ga_1$ alloy in the same manner as in Example 1. The magnetic powder was blended with 33 volume % of EVA to form pellets. The pellets were injection-molded at 150° C. A test piece produced by the injection molding was in a circular shape of 20 mm in diameter and 10 mm in thickness, and the magnetic field applied during the injection molding was 8 kOe. The magnetic properties of the test piece was Br of nearly 7.1 KG, bHc of nearly 5.8 kOe, iHc of nearly 18.5 kOe and (BH)max of nearly 10.5 MGOe when measured at a magnetization intensity of 25 kOe.

EXAMPLE 4

Anisotropic resin-bonded magnets having the compositions as shown using Table 4 were prepared in the same compression molding method as in Example 1. The magnetic properties measured are shown in Table 4.

Sample Nos. 1–5 show the influence of Nd, Sample Nos. 6–10 show the influence of B, and Sample Nos. 11–19 show the influence of Ga. And Sample Nos. 20–23, 24–27, 28–31, 32–35, 36–39, 40–43, 44–47, 48–51, 52–55, 56–59, 60–63 and 64–67 respectively show the effects of Ga plus additional elements, W, V, Ta, Mo, Si, Al, Zr, Hf, P, C, Zn and Nb.

It is clear from this table that Nd is preferably 11–18 atomic %, boron 4–11 atomic %, Ga 5 atomic % or less and each additional element 3 atomic % or less.

Incidentally, the same effects of Ga and Ga plus the additional element M were found in the so-called sintering method.

TABLE 4

| Sample | Alloy Composition (at. at. %) Nd | Fe | B | Ga | M | Br (kG) | bHc (k)e) | iHc (kOe) | (BH)max (MGOe) |
|---|---|---|---|---|---|---|---|---|---|
| 1* | 10 | 82.5 | 7 | 0.5 | — | 3.0 | 1.9 | 15.1 | 1.2 |
| 2 | 11 | 81.5 | 7 | 0.5 | — | 5.3 | 4.0 | 16.2 | 5.1 |
| 3 | 15 | 77.5 | 7 | 0.5 | — | 7.7 | 6.8 | 18.4 | 13.8 |
| 4 | 18 | 74.5 | 7 | 0.5 | — | 7.0 | 6.0 | 19.4 | 10.8 |
| 5* | 19 | 73.5 | 7 | 0.5 | — | 6.8 | 5.4 | 19.8 | 10.3 |
| 6* | 15 | 81.5 | 3 | 0.5 | — | 3.0 | 1.5 | 7.3 | 1.3 |
| 7 | 15 | 80.5 | 4 | 0.5 | — | 4.2 | 2.0 | 8.4 | 2.0 |
| 8 | 15 | 76.5 | 8 | 0.5 | — | 7.4 | 6.1 | 20.0 | 12.9 |
| 9 | 15 | 73.5 | 11 | 0.5 | — | 6.9 | 5.9 | 21.1 | 10.8 |
| 10* | 15 | 72.5 | 12 | 0.5 | — | 6.7 | 5.5 | 21.5 | 10.5 |
| 11* | 15 | 78 | 7 | 0 | — | 8.0 | 7.1 | 8.1 | 14.2 |
| 12 | 15 | 77.5 | 7 | 0.5 | — | 7.8 | 7.0 | 18.4 | 13.8 |
| 13 | 15 | 77 | 7 | 1.0 | — | 7.6 | 6.9 | 19.4 | 3.6 |
| 14 | 15 | 76.5 | 7 | 1.5 | — | 7.4 | 6.5 | 22.0 | 13.0 |
| 15 | 15 | 76.0 | 7 | 2.0 | — | 7.4 | 6.4 | 22.1 | 12.8 |
| 16 | 15 | 75.0 | 7 | 3.0 | — | 7.3 | 6.3 | 22.0 | 12.7 |
| 17 | 15 | 74.0 | 7 | 4.0 | — | 7.2 | 6.2 | 22.0 | 12.4 |
| 18 | 15 | 73.0 | 7 | 5.0 | — | 7.0 | 6.0 | 22.0 | 11.0 |
| 19* | 15 | 72.8 | 7 | 5.2 | — | 6.0 | 5.7 | 21.7 | 8.7 |
| 20 | 15 | 77.5 | 7 | 0.5 | 0.001 W | 7.7 | 7.0 | 18.7 | 13.7 |
| 21 | 15 | 76.5 | 7 | 0.5 | 1 W | 7.5 | 6.5 | 20.5 | 12.5 |
| 22 | 15 | 74.5 | 7 | 0.5 | 3 W | 7.0 | 6.1 | 19.6 | 11.8 |
| 23* | 15 | 74.3 | 7 | 0.5 | 3.2 W | 5.9 | 4.2 | 15.4 | 7.5 |
| 24 | 15 | 77.5 | 7 | 0.5 | 0.001 V | 7.9 | 7.0 | 19.0 | 14.0 |
| 25 | 15 | 76.5 | 7 | 0.5 | 1 V | 7.6 | 6.7 | 23.4 | 13.4 |
| 26 | 15 | 74.5 | 7 | 0.5 | 3 V | 7.2 | 6.4 | 22.8 | 12.9 |
| 27* | 15 | 74.3 | 7 | 0.5 | 3.2 V | 6.2 | 4.8 | 13.3 | 8.0 |
| 28 | 15 | 77.5 | 7 | 0.5 | 0.001 Ta | 7.7 | 6.8 | 18.7 | 13.8 |
| 29 | 15 | 76.5 | 7 | 0.5 | 1 Ta | 7.4 | 6.4 | 20.1 | 12.2 |
| 30 | 15 | 74.5 | 7 | 0.5 | 3 Ta | 7.2 | 6.0 | 19.8 | 11.9 |
| 31* | 15 | 74.3 | 7 | 0.5 | 3.2 Ta | 6.1 | 4.2 | 14.4 | 8.0 |
| 32 | 15 | 77.5 | 7 | 0.5 | 0.001 Mo | 7.7 | 6.8 | 18.9 | 13.5 |
| 33 | 15 | 76.5 | 7 | 0.5 | 1 Mo | 7.5 | 6.6 | 22.1 | 12.5 |
| 34 | 15 | 74.5 | 7 | 0.5 | 3 Mo | 7.2 | 6.2 | 21.8 | 11.9 |
| 35* | 15 | 74.3 | 7 | 0.5 | 3.2 Mo | 6.3 | 4.2 | 15.1 | 8.3 |
| 36 | 15 | 77.5 | 7 | 0.5 | 0.001 Si | 8.0 | 7.3 | 19.4 | 15.2 |
| 37 | 15 | 76.5 | 7 | 0.5 | 1 Si | 7.8 | 7.1 | 22.3 | 14.4 |
| 38 | 15 | 74.5 | 7 | 0.5 | 3 Si | 7.6 | 6.8 | 21.0 | 13.8 |
| 39* | 15 | 74.3 | 7 | 0.5 | 3.2 Si | 6.3 | 4.7 | 15.2 | 8.7 |
| 40 | 15 | 77.5 | 7 | 0.5 | 0.001 Al | 7.9 | 7.0 | 18.7 | 14.7 |
| 41 | 15 | 76.5 | 7 | 0.5 | 1 Al | 7.6 | 6.9 | 21.7 | 13.7 |
| 42 | 15 | 74.5 | 7 | 0.5 | 3 Al | 7.4 | 6.6 | 20.6 | 12.9 |
| 43* | 15 | 74.3 | 7 | 0.5 | 3.2 Al | 6.2 | 4.5 | 15.0 | 8.3 |

TABLE 4-continued

| Sample | Alloy Composition (at. at. %) Nd | Fe | B | Ga | M | Br (kG) | bHc (k)e) | iHc (kOe) | (BH)max (MGOe) |
|---|---|---|---|---|---|---|---|---|---|
| 44 | 15 | 77.5 | 7 | 0.5 | 0.001 Zr | 8.2 | 7.4 | 19.6 | 15.5 |
| 45 | 15 | 76.5 | 7 | 0.5 | 1 Zr | 7.9 | 7.2 | 22.0 | 14.3 |
| 46 | 15 | 74.5 | 7 | 0.5 | 3 Zr | 6.8 | 6.7 | 20.8 | 13.2 |
| 47* | 15 | 74.3 | 7 | 0.5 | 3.2 Zr | 6.1 | 4.9 | 14.9 | 8.7 |
| 48 | 15 | 77.5 | 7 | 0.5 | 0.001 Hf | 7.9 | 7.0 | 18.7 | 14.9 |
| 49 | 15 | 76.5 | 7 | 0.5 | 1 Hf | 7.6 | 6.8 | 20.3 | 14.2 |
| 50 | 15 | 74.5 | 7 | 0.5 | 3 Hf | 7.4 | 6.4 | 19.8 | 12.9 |
| 51* | 15 | 74.3 | 7 | 0.5 | 3.2 Hf | 6.3 | 4.7 | 14.7 | 8.7 |
| 52 | 15 | 77.5 | 7 | 0.5 | 0.001 P | 7.6 | 7.0 | 18.6 | 13.6 |
| 53 | 15 | 76.5 | 7 | 0.5 | 1 P | 7.4 | 6.4 | 20.4 | 12.4 |
| 54 | 15 | 74.5 | 7 | 0.5 | 3 P | 6.9 | 5.9 | 19.7 | 11.7 |
| 55* | 15 | 74.3 | 7 | 0.5 | 3.2 P | 5.7 | 4.1 | 15.3 | 7.4 |
| 56 | 15 | 77.5 | 7 | 0.5 | 0.001 C | 7.6 | 6.8 | 18.8 | 13.5 |
| 57 | 15 | 76.5 | 7 | 0.5 | 1 C | 7.4 | 6.6 | 21.9 | 12.5 |
| 58 | 15 | 74.5 | 7 | 0.5 | 3 C | 7.0 | 6.3 | 20.8 | 11.9 |
| 59* | 15 | 74.3 | 7 | 0.5 | 3.2 C | 6.2 | 4.2 | 15.0 | 8.2 |
| 60 | 15 | 77.5 | 7 | 0.5 | 0.001 Zn | 8.2 | 7.5 | 19.8 | 15.8 |
| 61 | 15 | 76.5 | 7 | 0.5 | 1 Zn | 8.0 | 7.2 | 22.8 | 14.8 |
| 62 | 15 | 74.5 | 7 | 0.5 | 3 Zn | 7.8 | 6.9 | 21.4 | 14.0 |
| 63* | 15 | 74.3 | 7 | 0.5 | 3.2 Zn | 6.5 | 4.7 | 15.3 | 8.6 |
| 64 | 15 | 77.5 | 7 | 0.5 | 0.001 Nb | 7.8 | 7.0 | 18.5 | 13.9 |
| 65 | 15 | 76.5 | 7 | 0.5 | 1 Nb | 7.6 | 6.9 | 21.2 | 13.0 |
| 66 | 15 | 74.5 | 7 | 0.5 | 3 Nb | 7.4 | 6.7 | 20.3 | 12.4 |
| 67* | 15 | 74.3 | 7 | 0.5 | 3.2 Nb | 6.1 | 4.8 | 14.8 | 8.5 |

Note
*Comparative Example

EXAMPLE 5

An alloy having the composition of $Nd_{14.3}Fe_{70.7}Co_{5.1}B_{6.9}Ga_{1.7}W_{1.3}$ was prepared by arc melting, and rapidly quenched by a single roll method. The resulting flaky sample was formed into bulky products by the following three methods:

(a) Heat-treating at 500°–700° C., impregnating with an epoxy resin and die molding.

(b) Heat-treating at 500°–700° C., and hot pressing.

(c) Hot isostatic pressing, and die upsetting to produce a [flatten] *flattened* product.

The magnetic properties of the resulting samples are shown in Table 5.

TABLE 5

| Production Method | [Br[kG]] *Br(kG)* | [iHc[kOe]] *iHc(kOe)* | [[BH]max] *(BH)max* [[MGOe]] *(MGOe)* | Average Grain Size [[μm]] *μm* |
|---|---|---|---|---|
| [a] *(a)* | 6.0 | 22.6 | 7.1 | 0.04 |
| [b] *(b)* | 8.0 | 20.2 | 12.6 | 0.08 |
| [c] *(c)* | 12.4 | 19.6 | 36.0 | 0.12 |

After heating each sample at various temperatures for 30 minutes, the variation of open flux was measured to investigate the thermal stability of each sample. Incidentally, the sample measured was worked to have a permeance coefficient Pc=−2. The results are shown in FIG. 1. It is shown that the upset flat product (c)had a small average crystal grain size and good (BH)max.

EXAMPLE 6

An alloy having the composition of $Nd_{14.1}Fe_{73.0}Co_{3.4}B_{6.9}Ga_{1.7}W_{0.9}$ was prepared by arc melting and then rapidly quenched by a single roll method. The resulting flaky sample was compressed by HIP and upset by a die to provide a [flatten] *flattened* product. The resulting bulky sample was pulverized to 80 μm or less, impregnated with an epoxy resin and then molded in [an] *a* magnetic field. The resulting magnet had magnetic properties of Br=7.1 kG, iHc=22.0 kOe and (BH)max=11.1 MGOe.

EXAMPLE 7

An $Nd_{15}Fe_{72.7}Co_{3.2}B_7Ga_{1.8}Nb_{0.3}$ alloy was treated in the same manner as in Example 1 to produce magnetic powder. This magnetic powder was blended with an EVA binder to form pellets which were then injection-molded to produce a magnet of 12 mm in inner diameter, 16 mm in outer diameter and 25 mm in height. This magnet had anisotropy in a radial direction, and a sample of 1.5 mm×1.5 mm×1.5 mm was cut out for evaluating its magnetic properties. They were Br=6.5 kG, bHc=5.8 kOe, iHc=24.2 kOe and (BH)max=8.5MGOe.

EXAMPLE 8

Figure 2:
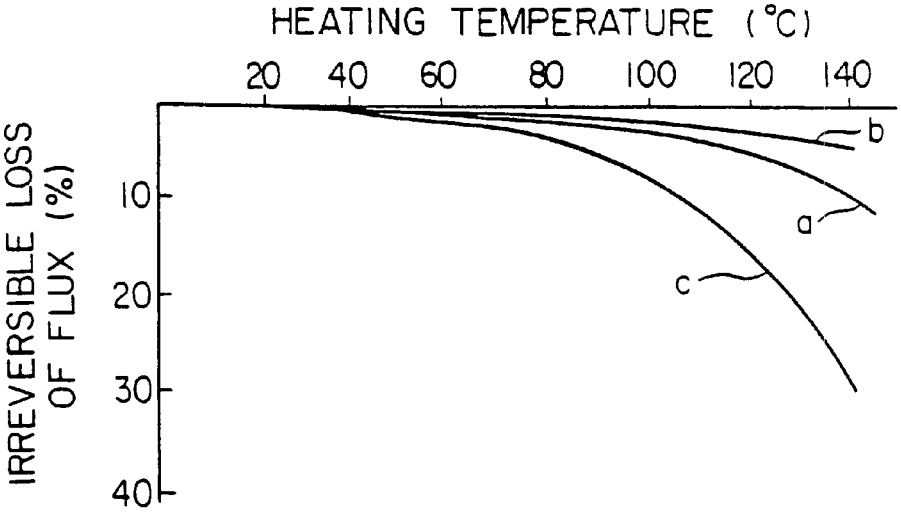
FIG. 2 is a graph showing the comparison in thermal stability of the anisotropic resin-bonded magnet (a) of Example 8, an anisotropic sintered magnet of $Sm_2Co_{17}$ (b) and an anisotropic sintered magnet having the composition of $Nd_{13}DyFe_{76.8}Co_{2.2}B_6Ga_{0.9}Ta_{0.1}$ (c).

An anisotropic resin-bonded magnet of a compression molding type having the composition of $Nd_{13}DyFe_{76.8}Co_{2.2}B_6Ga_{0.9}Ta_{0.1}$ was prepared in the same manner as in Example 1. The magnetic properties of the magnet were Br of nearly 6.6 kG, bHc of nearly 6.2 kOe, iHc of nearly 21.0 kOe and (BH)max of nearly 10.2MGOe. The magnet had a crystal grain size of 0.11 μm. The magnet was worked to 10 mm in diameter × 7 mm thick and tested with respect to thermal stability. The results are shown in FIG. 2 as curve a. For comparison as the magnet in curve a an anisotropic sintered $Sm_2Co_{17}$ magnet (curve b) and an anisotropic R-Fe-B sintered magnet (curve a) of the same composition were tested.

It is shown that the anisotropic resin-bonded magnet of the present invention had better thermal stability than the comparable anisotropic sintered magnet of the same composition tested as a comparative material.

EXAMPLE 9

Example 1 was repeated except for changing the particle size of magnetic powder to prepare an anisotropic resin-bonded magnet of $Nd_{14}Fe_{79}B_6Ga_1$. For comparison, an anisotropic sintered magnet of $Nd_{13}Dy_2Fe_{78}B_7$, was used to investigate the variation of coercive force with particle size. The results are shown in Table 6. It is shown that a sintered body has a coercive force decreased by pulverization, unable to be used as a starting a material for resin-bonded magnets, while the hot pressed and die upset magnet of the present invention undergoes substantially no decrease in coercive force by pulverization.

TABLE 6

| Powder Size | Coercive Force [[kOe]] *(kOe)* Pulverized Magnet of Present Invention | Pulverized Sintered Magnet |
|---|---|---|
| Before Pulverization | 21.3 | 18.8 |
| 250–500 μm | 21.3 | 5.7 |
| 177–250 μm | 21.2 | 4.2 |
| 105–177 μm | 21.1 | 3.6 |
| 49–105 μm | 21.1 | 2.8 |
| 0–49 μm | 21.0 | 2.1 |

EXAMPLE 10

Example 1 was repeated except for changing crystal grain size by changing the upsetting temperature to prepare an anisotropic resin-bonded magnet. The results [are shown in Table 7. It is shown] *showed* that with an average crystal grain size of 0.01 μm to 0.5 μm, good magnetic properties can be achieved.

[TABLE 7

| Upsetting Temperature (° C.) | Average Crystal Grain Size (μm) | Br (KG) | bHc (KOe) | iHc (KOe) | (BH)max (MGOe) |
|---|---|---|---|---|---|
| 650 | 0.01 | 5.7 | 4.6 | 8.9 | 6.9 |
| 750 | 0.09 | 7.6 | 6.5 | 19.0 | 13.5 |
| 760 | 0.17 | 6.9 | 6.1 | 11.5 | 10.7 |
| 780 | 0.38 | 6.5 | 6.1 | 10.4 | 10.1 |
| 800 | 0.50 | 6.0 | 5.8 | 8.7 | 8.4 |
| 820 | 0.80 | 4.3 | 3.6 | 5.2 | 3.8 |

]

EXAMPLE 11

Example 1 was repeated except for changing the heat treatment time to prepare an upset sample of R-Fe-B-Ga. The results are shown in Table [8] *7*. It is shown that magnetic properties do not change as long as the heating time at 750° C. is within 240 minutes.

TABLE [8] *7*

| Heating Time [[min.]] *(min.)* | [iHc[kOe]] *iHc(kOe)* Before Heat Treatment | After Heat Treatment |
|---|---|---|
| 5 | 21.1 | 22.2 |
| 10 | 21.3 | 22.9 |
| 30 | 22.2 | 22.8 |
| 60 | 21.8 | 22.3 |
| 120 | 21.7 | 22.5 |
| 240 | 20.8 | 21.7 |
| 300 | 22.0 | 22.8 |

EXAMPLE 12

Example 1 was repeated except for changing the heat treatment temperature with the heating time of 10 minutes to prepare an upset sample of R-Fe-B-Ga. The results are shown in Table [9] *8*. It is shown that with heat treatment temperature of 600°–900° C., good magnetic properties can be obtained.

TABLE [9] *8*

| Heat Treatment Temperature [[° C.]] *(° C.)* | [iHc[kOe]] *iHc(kOe)* after Heat Treatment |
|---|---|
| No Heat Treatment | 22.0 |
| 500 | 15.8 |
| 550 | 16.9 |
| 600 | 19.8 |
| 650 | 22.8 |
| 700 | 23.5 |
| 750 | 23.4 |
| 800 | 22.5 |
| 850 | 21.8 |
| 900 | 19.0 |
| 950 | 16.0 |

EXAMPLE 13

Example 1 was repeated except for changing the cooling method with a constant heating [tim] *time* of 10 minutes to prepare an upset sample of Nd-Fe-B-Ga. The results are shown in Table [10] *9*. It is shown that with the cooling rate of 1° C./sec or more, good results are obtained.

TABLE [10] *9*

| Cooling Method | Cooling Rate [[° C./sec]] *(° C./sec)* | Coercive Force [[kOe]] *(kOe)* |
|---|---|---|
| Water Cooling | 370 | 23.1 |
| Oil Cooling | 180 | 23.3 |
| Rapid Cooling with Ar | 61 | 23.0 |
| Slow Cooling with Ar | 18 | 22.5 |
| Spontaneous Cooling in Vacuum | 4 | 20.2 |
| Cooling in Furnace | 0.3 | 20.4 |
| Before Heat Treatment | — | 21.1 |

As described above in detail, the magnetic powder for anisotropic resin-bonded magnets containing Ga according to the present invention has excellent magnetizability and small irreversible loss of flux even in a relatively high temperature environment, and is useful for anisotropic resin-bonded magnets which can be magnetized after assembling.

What is claimed is:

1. A magnetically anisotropic magnetic powder of rare earth-iron-boron having improved thermal stability, having an average particle size of 1–1000 μm and made from a magnetically anisotropic R-TM-B-Ga alloy having an average crystal grain size of 0.01–0.5 μm, wherein R represents one or more rare earth elements including Y, TM represents Fe which may be partially substituted by Co, B represents boron and Ga represents gallium, wherein said R-TM-B-Ga alloy comprises 11–18 atomic % of R, 4–11 atomic % of B, 5 atomic % or less of Ga, and balance Fe which may be partially substituted by 30 at. % or less of Co, and inevitable impurities.

2. The magnetically anisotropic magnetic powder according to claim 1, wherein said R-TM-B-Ga alloy powder consists essentially of 11–18 atomic % of R, 4–11 atomic % of B, 5 atomic % or less of Ga, and balance Fe which may be partially substituted by Co, and inevitable impurities.

3. The magnetically anisotropic magnetic powder according to claim 1, having a residual magnetic flux density of 8 KG or more in the direction of the axis of said magnetic powder along which it is easily magnetizable.

4. The magnetically anisotropic magnetic powder according to claim 1, wherein said anisotropic R-TM-B-Ga alloy powder is prepared by pressing flakes obtained from a melt having the composition of R-TM-B-Ga by a rapid quenching method to provide a pressed magnet, giving it anisotropy by plastic deformation and then pulverizing it.

5. The magnetically anisotropic magnetic powder according to claim 4, wherein the anisotropy is given by die upsetting while heating.

6. The magnetically anisotropic magnetic powder according to claim 1, wherein the ratio of the average dimension (c) of said crystal grains measured perpendicular to their C axes to the average dimension (a) thereof measured parallel to their C axes is 2 or more.

7. A magnetically anisotropic pressed powder magnet having improved thermal stability, made of magnetically anisotropic R-TM-B-Ga alloy having an average crystal grain size of 0.01–0.5 μm wherein R consisting essentially of Nd part of which may be substituted with Dy, TM represents Fe which may be partially substituted by Co, B represents boron, and Ga represents gallium, said magnetically anisotropic R-TM-B-Ga alloy having an axis of easy magnetization, wherein said R-TM-B-Ga alloy comprises 11–18 atomic % of R, 4–11 atomic % of B, 5 atomic % or less of Ga and balance Fe which may be partially substituted by 30 [at %] *atomic* % or less of Co, and inevitable impurities.

8. The magnetically anisotropic pressed powder magnet according to claim 7, wherein said R-TM-B-Ga alloy consists essentially of 11–18 atomic % of R, 4–11 atomic % of B, 5 atomic % or less of Ga and balance Fe which may be partially substituted by Co, and inevitable impurities.

9. The magnetically anisotropic pressed powder magnet according to claim 7, wherein said anisotropic R-TM-B-Ga alloy [powder is] *is powder* prepared by pressing flakes obtained from a melt having the composition of R-TM-B-Ga by a rapid quenching method to provide a pressed magnet, giving it anisotropy by plastic deformation and then pulverizing it.

10. The magnetically anisotropic pressed powder magnet according to claim 9, wherein the anisotropy is given by die upsetting while heating.

11. A magnetically anisotropic resin-bonded magnet of rare earth-iron-boron having improved thermal stability composed of 15–40 volume % of a resin binder and balance R-TM-B-Ga alloy powder having an average crystal grain size of 0.01–0.5 μm, wherein R represents one or more rare earth elements including Y, TM represents Fe which may be partially substituted by Co, B represents boron and Ga represents gallium, said magnetically anisotropic R-TM-B-Ga alloy having an axis of easy magnetization, wherein said R-TM-B-Ga alloy comprises 11–18 atomic % of R, 4–11 atomic % of B, 5 atomic % or less of Ga, and balance Fe which may be partially substituted by 30 at % or less of Co, and inevitable impurities.

12. The magnetically anisotropic resin-bonded magnet according to claim 11, wherein said R-TM-B-Ga alloy consists essentially of 11–18 atomic % of R, 4–11 atomic % of B, 5 atomic % or less of Ga and balance Fe which may be partially substituted by Co, and inevitable impurities.

13. The magnetically anisotropic resin-bonded magnet according to claim 11, wherein said anisotropic R-TM-B-Ga alloy powder is prepared by rapidly quenching a melt of the R-TM-B-Ga composition to form flakes which are pressed and then subjected to plastic deformation to have anisotropy and then pulverized.

14. The magnetically anisotropic resin-bonded magnet according to claim 13, wherein the anisotropy is given by die upsetting while heating.

15. A magnetically anisotropic magnetic powder of rare earth-iron-boron having improved thermal stability, the powder having an average particle size of 1–1000 μm, and composed of an R-TM-B-Ga-M alloy powder having an average crystal grain size of 0.01–0.5 μm, wherein R represents one or more rare earth elements including Y, TM represents Fe which may be partially substituted by Co, B represents boron, Ga represents gallium and M represents one or more elements selected from the group consisting of Nb, W, V, Ta, Mo, Si, Al, Zr, Hf, P, C and Zn, wherein said R-TM-B-Ga-M alloy comprises 11–18 atomic % of R, 4–11 atomic % of B, 5 atomic % or less of Ga, 3 atomic % or less of M and balance Fe which may be partially substituted by 30 at % or less of Co, and inevitable impurities.

16. The magnetically anisotropic magnetic powder according to claim 15, wherein said R-TM-B-Ga-M alloy consists essentially of 11–18 atomic % of R, 4–11 atomic % of B, 5 atomic % or less of Ga, 3 atomic % or less of M and balance Fe which may be partially substituted by Co, and inevitable impurities.

17. The magnetically anisotropic magnetic powder according to claim 16, wherein the residual magnetic flux density thereof in the direction of easy magnetization axis is 8 KG or more.

18. The magnetically anisotropic magnetic powder according to claim 15, wherein said anisotropic R-TM-B-Ga-M alloy powder is prepared by rapidly quenching a melt of the R-TM-B-Ga-M composition to form flakes which are pressed and then subjected to plastic deformation to have anisotropy and then pulverized.

19. The magnetically anisotropic magnetic powder according to claim 18, wherein the anisotropy is given by die upsetting while heating.

20. The magnetically anisotropic magnetic powder according to claim 15, wherein the ratio of an average dimension (c) of said crystal grains measured perpendicular to their C axes to an average dimension (a) thereof measured parallel to their C axes is 2 or more.

21. The magnetically anisotropic magnetic powder according to claim 20, wherein said R-TM-B-Ga-M alloy powder consists essentially of 11–18 atomic % of R, 4–11 atomic % of B, 5 atomic % or less of Ga, 3 atomic % or less of M and balance Fe which may be partially substituted by Co, and inevitable impurities.

22. The magnetically anisotropic magnetic powder according to claim 21, wherein the residual magnetic flux density thereof in the direction of easy magnetization axis is 8 KG or more.

23. A magnetically anisotropic pressed powder magnet having improved thermal stability made of magnetically anisotropic R-TM-B-Ga-M alloy having an average crystal grain size of 0.01–0.5 μm, wherein R consisting essentially of Nd part of which may be substituted by Dy, TM represents Fe which may be partially substituted by Co, B represents boron, Ga represents gallium, and M represents one or more elements selected from the group consisting of Nb, W, V, Ta, Mo, Si, Al, Zr, Hf, P, C and Zn, said magnetically anisotropic R-TM-B-Ga-M alloy having an axis of easy magnetization, wherein said R-TM-B-Ga-M alloy comprises 11–18 atomic % of R, 4–11 atomic % of B, 5 atomic % or less of Ga, 3 atomic % or less of M and balance Fe which may be partially substituted by 30 [at %] *atomic* % or less of Co, and inevitable impurities.

24. The magnetically anisotropic pressed powder magnet according to claim 23, wherein *said* R-TM-B-Ga-M alloy consists essentially of 11–18 atomic % of R, 4–11 atomic % of B, 5 atomic % or less of Ga, 3 atomic % or less of M and balance Fe which may be partially substituted by Co, and inevitable impurities.

25. The magnetically anisotropic pressed powder magnet according to claim 23, wherein said anisotropic R-TM-B-Ga-M alloy [powder is] *is powder* prepared by rapidly quenching a melt of the R-TM-B-Ga-M composition to form flakes which are pressed and then subjected to plastic deformation to have anisotropy and then pulverized.

26. The magnetically anisotropic pressed powder magnet according to claim 25, wherein the anisotropy is given by die upsetting while heating.

27. A magnetically anisotropic resin-bonded magnet of rare earth-iron-boron having improved thermal stability composed of 15–40 volume % of a resin binder and balance R-TM-B-Ga-M alloy powder having an average crystal grain size of 0.01–0.5 $\mu$m, wherein R represents one or more rare earth elements including Y, TM represents Fe which may be partially substituted by Co, B represents boron, Ga represents gallium, and M represents one or more elements selected from the group consisting of Nb, W, V, Ta, Mo, Si, Al, Zr, Hf, P, C and Zn, said magnetically anisotropic R-TM-B-Ga-M alloy *powder* having an axis of easy magnetization, wherein said R-TM-B-Ga-M alloy *powder* comprises 11–18 atomic % of R, 4–11 atomic % of B, 5 atomic % or less of Ga, 3 atomic % or less of M and balance Fe which may be partially substituted by 30 [at %] *atomic* % of Co, and inevitable impurities.

28. The magnetically anisotropic resin-bonded magnet according to claim 27, wherein said R-TM-B-Ga-M alloy *powder* consists essentially of 11–18 atomic % of R, 4–11 atomic % of B, 5 atomic % or less of Ga, 3 atomic % or less of M and balance Fe which may be partially substituted by Co, and inevitable impurities.

29. The magnetically anisotropic resin-bonded magnet according to claim 27, wherein said anisotropic R-TM-B-Ga-M alloy powder is prepared by rapidly quenching a melt of the R-TM-B-Ga-M composition to form flakes which are pressed and then subjected to plastic deformation to have anisotropy and then pulverized.

30. The magnetically anisotropic resin-bonded magnet according to claim 29, wherein the anisotropy is given by die upsetting while heating.

31. The magnetically anisotropic magnetic powder according to claim 1, wherein Ga is 0.01–3 atomic %.

32. The magnetically anisotropic pressed powder magnet according to claim 7, wherein Ga is 0.01–3 atomic %.

33. The magnetically anisotropic resin-bonded magnet according to claim 11, wherein Ga is 0.01–3 atomic %.

34. The magnetically anisotropic magnetic powder according to claim 15, wherein Ga is 0.01–3 atomic %.

35. The magnetically anisotropic pressed powder magnet according to claim 23, wherein Ga is 0.01–3 atomic %.

36. The magnetically anisotropic resin-bonded magnet according to claim 27, wherein Ga is 0.01–3 atomic %.

37. The magnetically anisotropic magnetic powder according to claim 1, wherein R consists of Nd part of which may be substituted with Dy.

38. The magnetically anisotropic pressed powder magnet according to claim 7, wherein R consists of Nd part of which may be substituted with Dy.

39. The magnetically anisotropic resin-bonded magnet according to claim 11, wherein R consists of Nd part of which may be substituted with Dy.

40. The magnetically anisotropic magnetic powder according to claim 15, wherein R consists of Nd part of which may be substituted with Dy.

41. The magnetically anisotropic pressed powder magnet according to claim 23, wherein R consists of Nd part of which may be substituted with Dy.

42. The magnetically anisotropic resin-bonded magnet according to claim 27, wherein R consists of Nd part of which may be substituted with Dy.

* * * * *